US012680327B2

(12) United States Patent
Huang

(10) Patent No.: US 12,680,327 B2
(45) Date of Patent: Jul. 14, 2026

(54) PATH CONTROL METHOD, POOL CLEANING ROBOT, AND NON-TRANSITORY COMPUTER-READABLE STORAGE MEDIUM

(71) Applicant: SHENZHEN AIPER INTELLIGENT CO., LTD., Shenzhen (CN)

(72) Inventor: Qi Huang, Shenzhen (CN)

(73) Assignee: SHENZHEN AIPER INTELLIGENT CO., LTD., Shenzhen (CN)

( * ) Notice: Subject to any disclaimer, the term of this patent is extended or adjusted under 35 U.S.C. 154(b) by 0 days.

(21) Appl. No.: 19/177,739

(22) Filed: Apr. 14, 2025

(65) Prior Publication Data

US 2026/0062941 A1      Mar. 5, 2026

(30) Foreign Application Priority Data

Sep. 5, 2024    (CN) .......................... 202411246923.5

(51) Int. Cl.
*E04H 4/16* (2006.01)
*B25J 9/16* (2006.01)
(Continued)

(52) U.S. Cl.
CPC .......... *E04H 4/1654* (2013.01); *B25J 9/1664* (2013.01); *B25J 11/0085* (2013.01); *G05D 1/648* (2024.01); *G05D 1/6484* (2024.01)

(58) Field of Classification Search
None
See application file for complete search history.

(56) References Cited

U.S. PATENT DOCUMENTS

2007/0199870 A1    8/2007  Sommer et al.
2017/0342733 A1    11/2017  Korenfeld et al.
(Continued)

FOREIGN PATENT DOCUMENTS

CN        115185282 A  * 10/2022  ........... E04H 4/1654
CN        116466725 A    7/2023
(Continued)

OTHER PUBLICATIONS

The First Office ActionCN 2024112469235Mail Date Jul. 19, 2025.
The extended European search reportEU 25170252.8Mail Date Oct. 6, 2025.

*Primary Examiner* — Khoi H Tran
*Assistant Examiner* — Dairon Estevez
(74) *Attorney, Agent, or Firm* — IPro, PLLC

(57) ABSTRACT

The present disclosure relates to the field of underwater robots, and in particular to a path control method, a pool cleaning robot, and a non-transitory computer-readable storage medium. The path control method for a pool cleaning robot includes: controlling the pool cleaning robot to move along a first working path in a first direction on a first working surface of the pool to a boundary line between the first working surface and a second working surface; controlling the pool cleaning robot to cross the boundary line and move a first predetermined distance along a second working path in a second direction on the second working surface to reach a first switching point; and controlling the pool cleaning robot to move from the first switching point to the starting point of a third working path on the second working surface and move along the third working path in the second direction.

14 Claims, 5 Drawing Sheets

(51) Int. Cl.
  *B25J 11/00*   (2006.01)
  *G05D 1/648*   (2024.01)

(56)     References Cited

U.S. PATENT DOCUMENTS

| | | | |
|---|---|---|---|
| 2017/0362845 A1 * | 12/2017 | Korenfeld ............. | E04H 4/1654 |
| 2018/0071908 A1 | 3/2018 | Goldenberg et al. | |
| 2018/0135325 A1 * | 5/2018 | Schloss ................. | E04H 4/1654 |
| 2019/0061156 A1 | 2/2019 | Li et al. | |
| 2019/0243379 A1 * | 8/2019 | Attar ..................... | E04H 4/1654 |
| 2024/0141667 A1 * | 5/2024 | Liu ........................ | A47L 9/2852 |
| 2025/0305313 A1 * | 10/2025 | Wang .................... | E04H 4/1654 |

FOREIGN PATENT DOCUMENTS

| | | | |
|---|---|---|---|
| CN | 116501072 A | 7/2023 | |
| CN | 116700255 A | 9/2023 | |
| CN | 118170143 A | 6/2024 | |
| EP | 1826338 A2 | 8/2007 | |
| WO | 2021169188 A1 | 9/2021 | |

\* cited by examiner

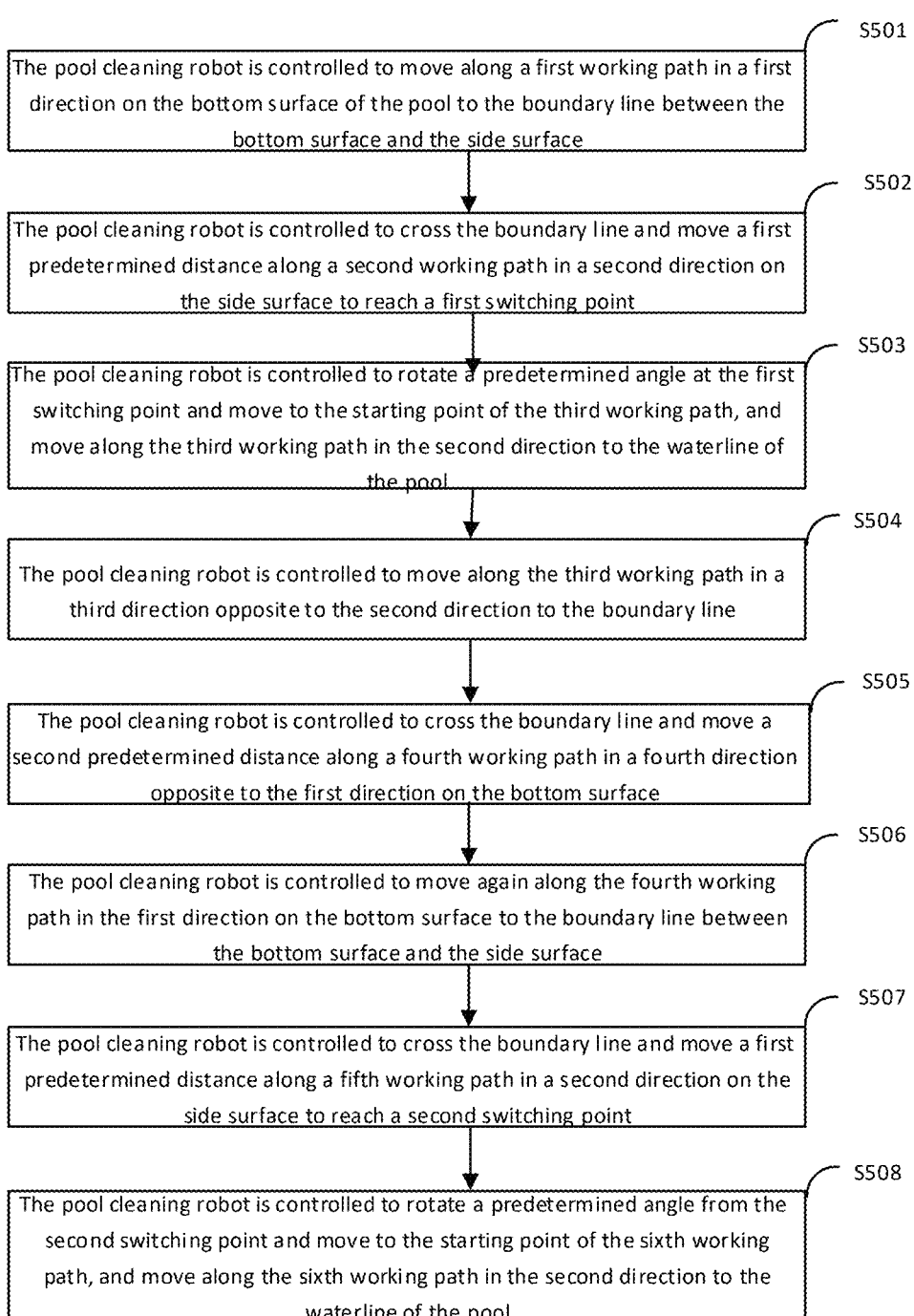

S501

The pool cleaning robot is controlled to move along a first working path in a first direction on the bottom surface of the pool to the boundary line between the bottom surface and the side surface

S502

The pool cleaning robot is controlled to cross the boundary line and move a first predetermined distance along a second working path in a second direction on the side surface to reach a first switching point

S503

The pool cleaning robot is controlled to rotate a predetermined angle at the first switching point and move to the starting point of the third working path, and move along the third working path in the second direction to the waterline of the pool

S504

The pool cleaning robot is controlled to move along the third working path in a third direction opposite to the second direction to the boundary line

S505

The pool cleaning robot is controlled to cross the boundary line and move a second predetermined distance along a fourth working path in a fourth direction opposite to the first direction on the bottom surface

S506

The pool cleaning robot is controlled to move again along the fourth working path in the first direction on the bottom surface to the boundary line between the bottom surface and the side surface

S507

The pool cleaning robot is controlled to cross the boundary line and move a first predetermined distance along a fifth working path in a second direction on the side surface to reach a second switching point

S508

The pool cleaning robot is controlled to rotate a predetermined angle from the second switching point and move to the starting point of the sixth working path, and move along the sixth working path in the second direction to the waterline of the pool

Figure 5

PATH CONTROL METHOD, POOL CLEANING ROBOT, AND NON-TRANSITORY COMPUTER-READABLE STORAGE MEDIUM

FIELD OF THE INVENTION

The present disclosure relates to the field of underwater robots, and in particular, to a path control method, a pool cleaning robot, and a non-transitory computer-readable storage medium.

BACKGROUND OF THE INVENTION

With the development of artificial intelligence technology, the pool cleaning robots have gradually become one of the main solutions in the field of household and commercial pool cleaning. Compared with the traditional manual cleaning method, the pool cleaning robots can independently clean the bottom and wall surfaces of the pool, with faster cleaning speed, better effect, and more economical.

At present, most pool cleaning robots cannot simultaneously take into account the cleaning of the side surfaces, bottom surface, junctions between the side and bottom surfaces, pool corners, and waterline areas in the control of the cleaning path, resulting in long cleaning time, low efficiency, and unsatisfactory cleaning effect.

SUMMARY OF THE INVENTION

In view of the above problems, the present disclosure is proposed. The present disclosure provides a path control method, a pool cleaning robot, and a non-transitory computer-readable storage medium.

According to one aspect of the present disclosure, a path control method for a pool cleaning robot is provided, including: controlling the pool cleaning robot to move along a first working path in a first direction on a first working surface of the pool to a boundary line between the first working surface and a second working surface; controlling the pool cleaning robot to cross the boundary line and move a first predetermined distance along a second working path in a second direction on the second working surface to reach a first switching point; and controlling the pool cleaning robot to move from the first switching point to the starting point of a third working path on the second working surface and move along the third working path in the second direction.

In addition, according to the path control method of one aspect of the present disclosure, one of the first working surface and the second working surface is the bottom surface of the pool, and the other of the first working surface and the second working surface is a side surface of the pool.

In addition, according to the path control method of one aspect of the present disclosure, further including: in the case where the second working surface is a side surface of the pool, controlling the pool cleaning robot to move along the third working path in the second direction to the waterline of the pool; controlling the pool cleaning robot to move along the third working path in a third direction opposite to the second direction to the boundary line.

In addition, according to the path control method of one aspect of the present disclosure, further including: controlling the pool robot to cross the boundary line and move a second predetermined distance along a fourth working path in a fourth direction opposite to the first direction on the first working surface.

In addition, according to the path control method of one aspect of the present disclosure, further including: controlling the pool cleaning robot to move again along the fourth working path in the first direction on the first working surface to the boundary line between the first working surface and the second working surface; controlling the pool cleaning robot to cross the boundary line and move a first predetermined distance along a fifth working path in the second direction on the second working surface to reach a second switching point; controlling the pool cleaning robot to move from the second switching point to the starting point of a sixth working path on the second working surface and move along the sixth working path in the second direction.

In addition, according to the path control method of one aspect of the present disclosure, the first predetermined distance is determined at least based on the water depth of the pool and/or the distance of the pool cleaning robot from the liquid surface of the pool.

In addition, according to the path control method of one aspect of the present disclosure, the step of controlling the pool cleaning robot to move to the third working path on the second working surface includes: controlling the pool cleaning robot to rotate a predetermined angle at the first switching point and move to the starting point of the third working path.

In addition, according to the path control method of one aspect of the present disclosure, the second working path is parallel to the third working path, and the distance between the second working path and the third working path is less than or equal to a predetermined width.

In addition, according to the path control method of one aspect of the present disclosure, further including: before controlling the pool cleaning robot to move on the first working surface of the pool, determining the second working surface and taking the direction perpendicular to the second working surface as the first direction.

In addition, according to the path control method of one aspect of the present disclosure, the second working surface is a working surface to be cleaned and/or a working surface closest to the pool cleaning robot.

According to another aspect of the present disclosure, a pool cleaning robot is provided, including: a memory for storing computer-readable instructions; and a processor for running the computer-readable instructions, so that the pool cleaning robot executes the path control method as described above.

According to yet another aspect of the present disclosure, a non-transitory computer-readable storage medium is provided for storing computer-readable instructions. When the computer-readable instructions are executed by a processor, the processor executes the path control method as described above.

According to still another aspect of the present disclosure, a computer program product is provided, including a computer program. When the computer program is executed by a processor, the path control method as described above is implemented.

As will be described in detail below, according to the path control method for a pool cleaning robot, the pool cleaning robot, the non-transitory computer-readable storage medium, and the computer program product of the embodiments of the present disclosure, overall path planning across different working surfaces is carried out to achieve cleaning of the junctions, corners, and waterline areas formed by different working surfaces, thereby shortening the cleaning time and improving the working efficiency and cleaning effect.

BRIEF DESCRIPTION OF DRAWINGS

By combining the drawings to describe the embodiments of the present disclosure in more detail, the above and other objects, features, and advantages of the present disclosure will become more apparent. The drawings are used to provide a further understanding of the embodiments of the present disclosure and constitute a part of the specification, and are used together with the embodiments of the present disclosure to explain the present disclosure, but do not constitute a limitation on the present disclosure. In the drawings, the same reference numerals usually represent the same components or steps.

FIG. 5 is a flowchart further illustrating the path control method according to the embodiment of the present disclosure.

DETAILED DESCRIPTION OF THE INVENTION

In order to make the objects, technical solutions, and advantages of the present disclosure more apparent, the exemplary embodiments of the present disclosure will be described in detail below with reference to the accompanying drawings. Obviously, the described embodiments are only a part of the embodiments of the present disclosure, rather than all the embodiments. It should be understood that the present disclosure is not limited to the exemplary embodiments described herein.

Figure 1:
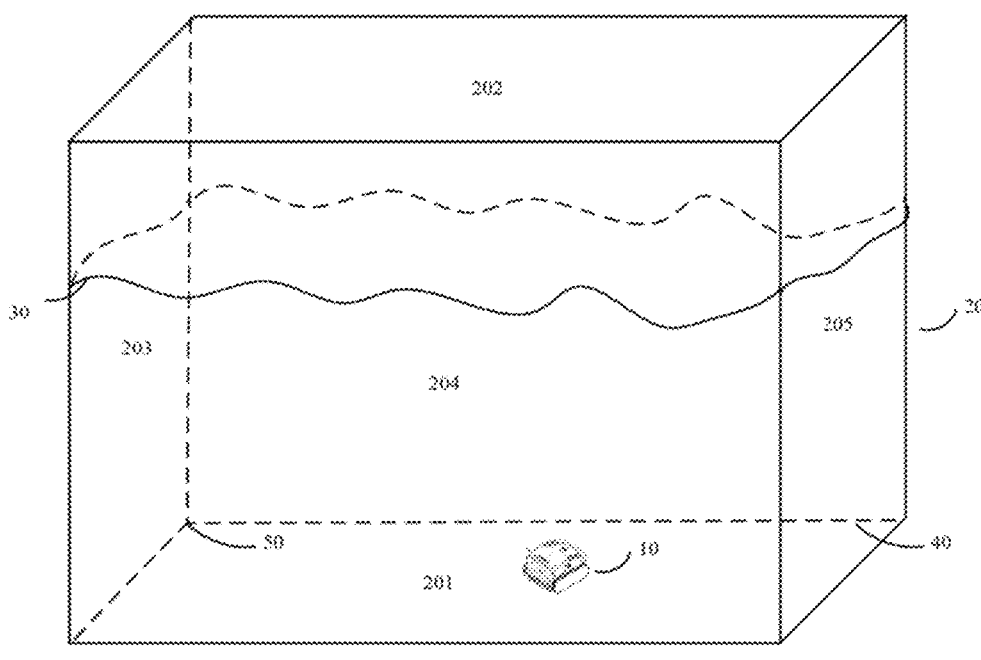
FIG. 1 is a scenario schematic diagram illustrating the application of the path control method according to the embodiment of the present disclosure.

FIG. 1 is a scenario schematic diagram illustrating the application of the path control method according to the embodiment of the present disclosure. As shown in FIG. 1, the pool cleaning robot 10 according to the embodiment of the present disclosure performs a cleaning operation in the pool 20. The pool 20 has a bottom surface 201, side surfaces 202, 203, 204, and 205, and a waterline 30. Each bottom surface and side surface form a boundary line 40 pairwise, and the bottom surface and two side surfaces form a pool corner 50 (only one boundary line and one pool corner are shown in FIG. 1). It should be understood that the pool cleaning robot 10 and the pool 20 shown in FIG. 1 are only schematic, and the pool cleaning robot and the pool to which the path control method according to the embodiment of the present disclosure is applied are not limited thereto.

The path control method according to the embodiment of the present disclosure performs overall path planning across different working surfaces (for example, across the bottom surface 201 and the side surface 202) to achieve cleaning of the boundary line 40, the pool corner 50, and the waterline 30 area formed by different working surfaces, thereby shortening the cleaning time and improving the working efficiency and cleaning effect. Hereinafter, the path control method according to the embodiment of the present disclosure will be further described in detail with reference to the accompanying drawings.

Figure 2:
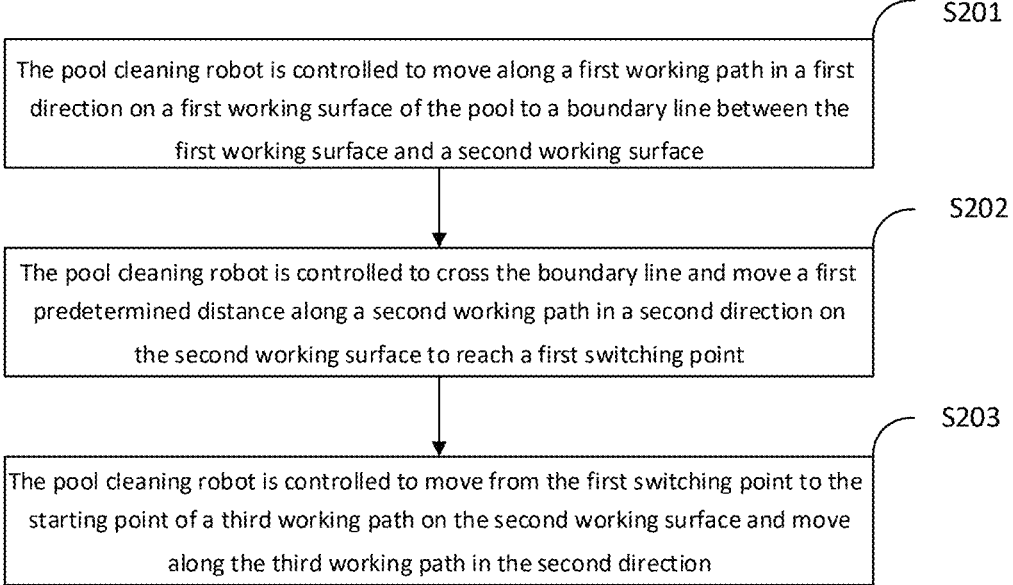
FIG. 2 is a flowchart illustrating the path control method according to the embodiment of the present disclosure.

FIG. 2 is a flowchart illustrating the path control method according to the embodiment of the present disclosure. As shown in FIG. 2, the path control method according to the embodiment of the present disclosure includes the following steps.

In step S201, the pool cleaning robot is controlled to move along a first working path in a first direction on a first working surface of the pool to a boundary line between the first working surface and a second working surface. In one embodiment of the present disclosure, one of the first working surface and the second working surface is the bottom surface of the pool, and the other of the first working surface and the second working surface is a side surface of the pool.

In step S202, the pool cleaning robot is controlled to cross the boundary line and move a first predetermined distance along a second working path in a second direction on the second working surface to reach a first switching point. In one embodiment of the present disclosure, the first predetermined distance is determined at least based on the water depth of the pool and/or the distance of the pool cleaning robot from the liquid surface of the pool.

In step S203, the pool cleaning robot is controlled to move from the first switching point to the starting point of a third working path on the second working surface and move along the third working path in the second direction. That is, both the second working path and the third working path on the second working surface are along the same second direction, that is, the second working path and the third working path are parallel.

The path control method according to the embodiment of the present disclosure shown in FIG. 2 will be further described with reference to FIGS. 3 and 4.

Figure 3:
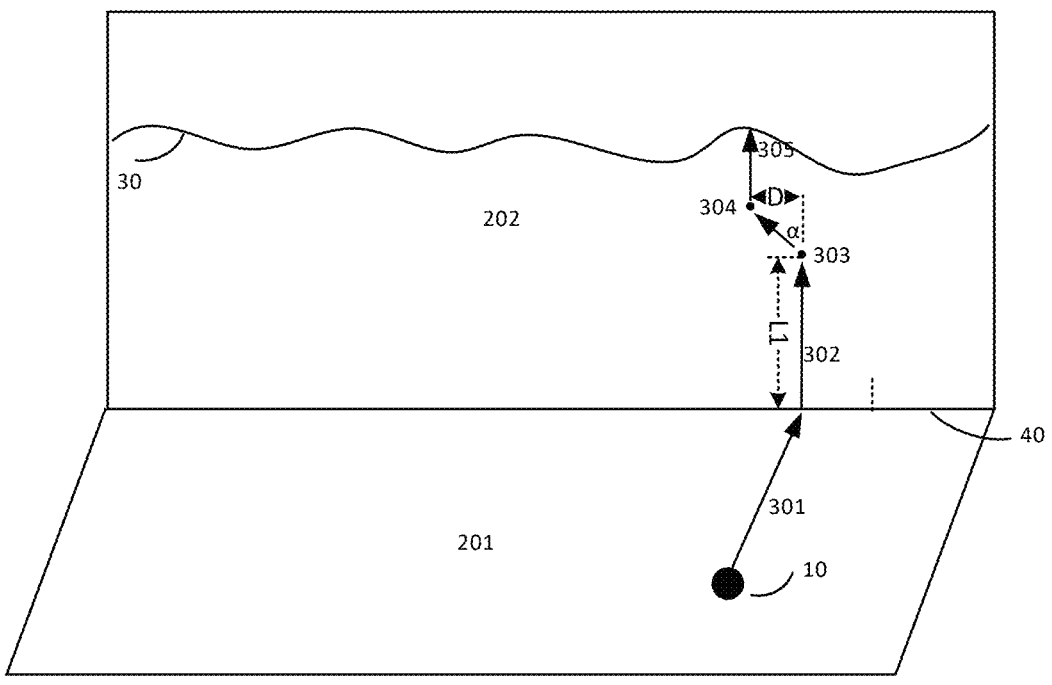
FIGS. 3 and 4 are schematic diagrams illustrating the path control method according to the embodiment of the present disclosure.

FIG. 3 shows the case where the first working surface 201 is the bottom surface of the pool 20 and the second working surface 202 is the side surface of the pool 20. As shown in FIG. 3, the pool cleaning robot 10 is controlled to move along a first working path 301 in a first direction on the first working surface 201 of the pool 20 to the boundary line 40 between the first working surface 201 and the second working surface 202.

Further, the pool cleaning robot 10 is controlled to cross the boundary line 40 and move a first predetermined distance L1 along a second working path 302 in a second direction on the second working surface 202 to reach a first switching point 303. Since the pool cleaning robot 10 is in a cleaning operation state when crossing the boundary line 40, the corresponding area of the boundary line 40 is cleaned. In one embodiment of the present disclosure, the first predetermined distance L1 is determined at least based on the water depth of the pool 20 and/or the distance of the pool robot 10 from the waterline 30. That is, as the water depth of the pool 20 is deeper or the distance of the pool cleaning robot 10 from the waterline 30 is larger, the first predetermined distance L1 can be correspondingly increased. And when the water depth of the pool 20 is shallower or the distance of the pool robot 10 from the waterline 30 is smaller, the first predetermined distance L1 needs to be correspondingly reduced to avoid the pool cleaning robot 10 being too close to the liquid surface after turning. Alternatively, in another embodiment of the present disclosure, the first switching point 303 can be directly set on the boundary line 40.

Further, the pool cleaning robot 10 is controlled to move from the first switching point 303 to the starting point 304 of the third working path 305 on the second working surface 202 and move along the third working path 305 in the second direction. Specifically, in one embodiment of the present disclosure, the pool cleaning robot is controlled to rotate a predetermined angle α at the first switching point and move to the starting point 304 of the third working path 305. More specifically, the predetermined angle α is preferably set in the range of 20°-40°. The second working path 302 and the third working path 305 are parallel, and the distance D between the second working path 302 and the third working path 305 is less than or equal to a predetermined width. Specifically, in one embodiment of the present disclosure, the distance D is less than or equal to the cleaning operation radius of the pool cleaning robot 10, for example, less than or equal to half the width of the fuselage of the pool cleaning robot 10. In this case, there is no blank working area in the direction perpendicular to the second direction between the second working path 302 and the third working path 305, so that the entire second working surface 202 can be covered.

Figure 4:
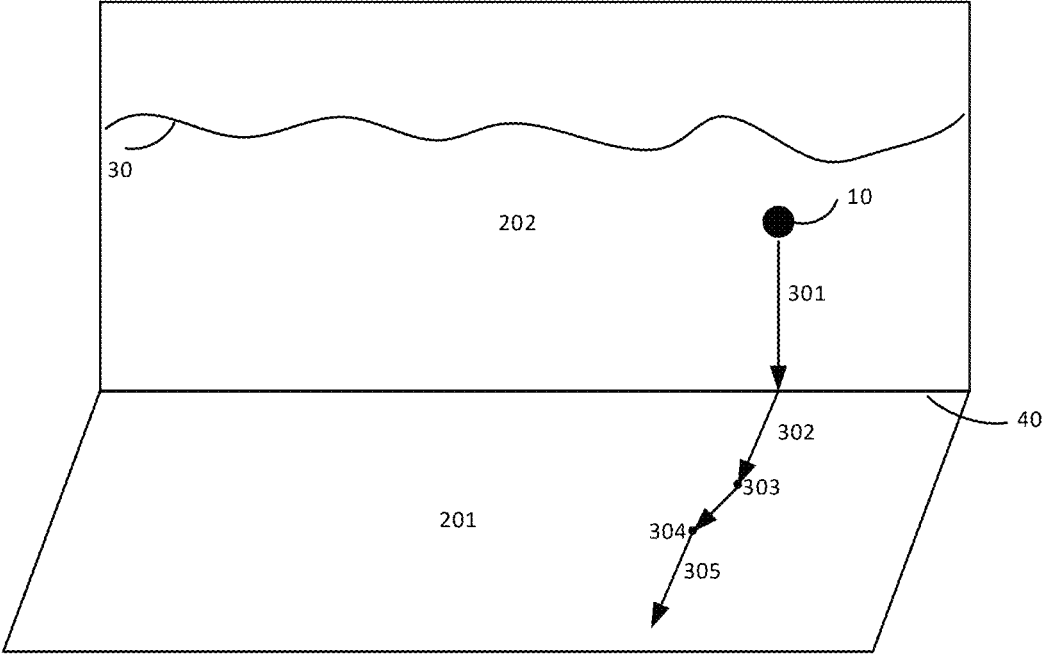

FIG. 4 shows the case where the first working surface 202 is the side surface of the pool 20 and the second working surface 201 is the bottom surface of the pool 20. Similar to the case shown in FIG. 3, the pool cleaning robot 10 is controlled to translate the working path on the second working surface 201, so as to achieve coverage of the boundary line 40 between the first working surface 202 and the second working surface 201 and the entire second working surface 201.

The above-described path control method according to the embodiment of the present disclosure with reference to FIGS. 2 to 4 realizes overall path planning across different working surfaces, cleans the junctions formed by different working surfaces, and by cleaning multiple junctions, the pool corner area can be cleaned. Hereinafter, the overall process of the path control method according to the embodiment of the present disclosure will be further described with reference to FIGS. 5 and 6. The examples in FIGS. 5 and 6 describe the case where the first working surface 201 is the bottom surface of the pool 20 and the second working surface 202 is the side surface of the pool 20. It is easy to understand that the path control method according to the embodiment of the present disclosure is not limited thereto.

In step S501, the pool cleaning robot is controlled to move along a first working path in a first direction on the bottom surface of the pool to the boundary line between the bottom surface and the side surface.

Figure 6:
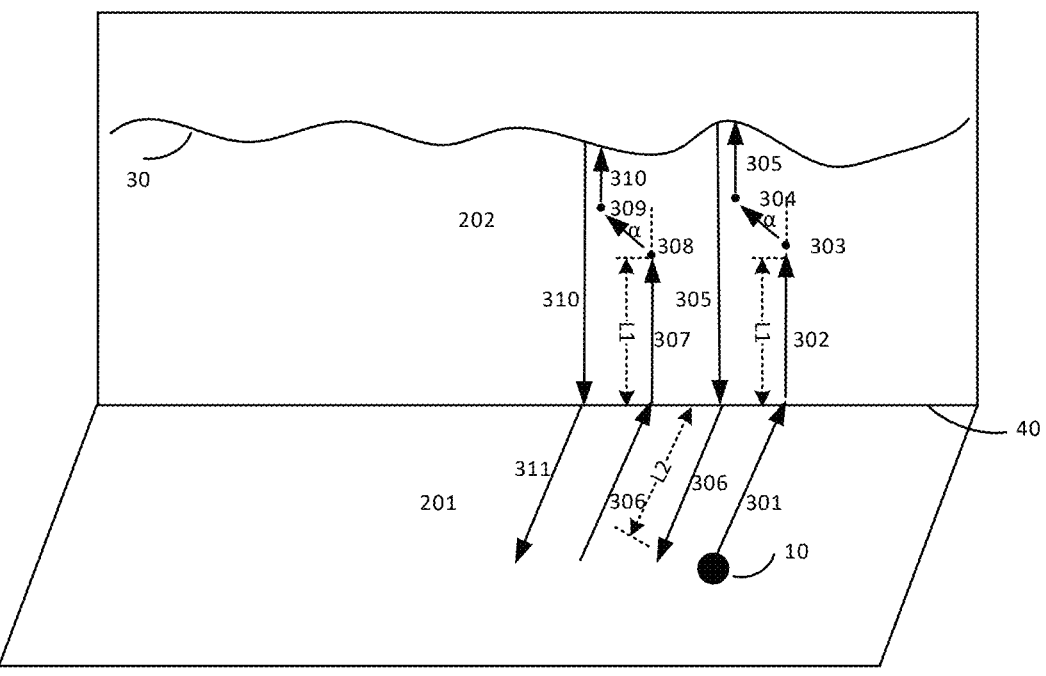
FIG. 6 is a schematic diagram further illustrating the path control method according to the embodiment of the present disclosure.

As shown in FIG. 6, the pool cleaning robot 10 is controlled to move along a first working path 301 in a first direction on the bottom surface 201 of the pool 20 to the boundary line 40 between the bottom surface 201 and the side surface 202. In one embodiment of the present disclosure, before controlling the pool cleaning robot 10 to move on the bottom surface 201 of the pool 20, the side surface 202 as the second working surface is determined, and the direction perpendicular to the side surface 202 is taken as the first direction. More specifically, the side surface 202 as the second working surface is the working surface to be cleaned and/or the side surface closest to the pool robot 10.

In step S502, the pool cleaning robot is controlled to cross the boundary line and move a first predetermined distance along a second working path in a second direction on the side surface to reach a first switching point.

As shown in FIG. 6, the pool cleaning robot 10 is controlled to cross the boundary line 40 and move a first predetermined distance L1 along a second working path 302 in a second direction on the side surface 202 to reach a first switching point 303. As described above, the first predetermined distance L1 is determined at least based on the water depth of the pool 20 and/or the distance of the pool cleaning robot 10 from the waterline 30. That is, as the water depth of the pool 20 is deeper or the distance of the pool cleaning robot 10 from the waterline 30 is larger, the first predetermined distance L1 can be correspondingly increased. And when the water depth of the pool 20 is shallower or the distance of the pool cleaning robot 10 from the waterline 30 is smaller, the first predetermined distance L1 needs to be correspondingly reduced to avoid the pool cleaning robot 10 being too close to the liquid surface after turning. Alternatively, in another embodiment of the present disclosure, the first switching point 303 can be directly set on the boundary line 40.

In step S503, the pool cleaning robot is controlled to rotate a predetermined angle at the first switching point and move to the starting point of the third working path, and move along the third working path in the second direction to the waterline of the pool.

As shown in FIG. 6, the pool cleaning robot 10 is controlled to rotate a predetermined angle α at the first switching point 303 and move to the starting point 304 of the third working path 305, and move along the third working path 305 in the second direction to the waterline 30 of the pool 20. As described above, the predetermined angle α is preferably set in the range of 20°-40°. The second working path 302 and the third working path 305 are parallel, and the distance D between the second working path 302 and the third working path 305 is less than or equal to a predetermined width.

In step S504, the pool cleaning robot is controlled to move along the third working path in a third direction opposite to the second direction to the boundary line.

As shown in FIG. 6, the pool cleaning robot 10 is controlled to move along the third working path 305 in a third direction opposite to the second direction to the boundary line 40. In one embodiment of the present disclosure, for example, a water detection sensor unit is configured by a capacitive plate sensor or an ultrasonic ranging device. When the water detection sensor unit detects that the pool cleaning robot 10 moves out of the waterline 30, the pool cleaning robot 10 is controlled to move backward, so as to move along the third working path 305 in the third direction opposite to the second direction to the boundary line 40. Since the pool cleaning robot 10 is in a cleaning operation state when moving backward after moving out of the waterline 30, the corresponding area of the waterline 30 is cleaned.

In step S505, the pool cleaning robot is controlled to cross the boundary line and move a second predetermined distance along a fourth working path in a fourth direction opposite to the first direction on the bottom surface.

As shown in FIG. 6, the pool cleaning robot 10 is controlled to cross the boundary line 40 and move a second predetermined distance L2 along a fourth working path 306 in a fourth direction opposite to the first direction on the bottom surface 201. In one embodiment of the present disclosure, the second predetermined distance L2 is, for example, in the range of 20 cm to 40 cm, that is, approximately half the width of the fuselage of the pool cleaning robot 10, as long as it can realize further controlling the pool cleaning robot 10 to return to the boundary line 40 again.

In step S506, the pool cleaning robot is controlled to move again along the fourth working path in the first direction on the bottom surface to the boundary line between the bottom surface and the side surface.

As shown in FIG. 6, the pool cleaning robot 10 is controlled to move again along the fourth working path 306 in the first direction on the bottom surface 201 to the boundary line 40 between the bottom surface 201 and the side surface 202.

In step S507, the pool cleaning robot is controlled to cross the boundary line and move a first predetermined distance along a fifth working path in a second direction on the side surface to reach a second switching point.

As shown in FIG. 6, the pool cleaning robot 10 is controlled to cross the boundary line 40 and move a first predetermined distance L1 along a fifth working path 307 in a second direction on the side surface 202 to reach a second switching point 308. It should be understood that during the process from the third working path 305 to the fourth working path 306 and then to the fifth working path 307, the pool cleaning robot 10 does not change the running angle. That is, the third working path 305 and the fifth working path 307 are substantially coincident, and different reference numerals are only used here for the convenience of description.

In step S508, the pool cleaning robot is controlled to rotate a predetermined angle from the second switching point and move to the starting point of the sixth working path, and move along the sixth working path in the second direction to the waterline of the pool.

As shown in FIG. 6, the pool cleaning robot 10 is controlled to rotate a predetermined angle α from the second switching point 308 and move to the starting point 309 of the sixth working path 310, and move along the sixth working path 310 in the second direction to the waterline 30 of the pool 20. Further, the pool cleaning robot 10 is controlled to move along the sixth working path 310 in the third direction opposite to the second direction to the boundary line 40. The pool cleaning robot 10 is controlled to cross the boundary line 40 and move along a seventh working path 311 in the fourth direction opposite to the first direction on the bottom surface 201. That is, the pool cleaning robot 10 repeats the working path including crossing the boundary line 40 between the bottom surface 201 and the side surface 202, translating the working path on the side surface 202, then moving to the waterline and then moving backward again and crossing the boundary line 40, so as to achieve cleaning of the junctions, corners, and waterline areas formed by different working surfaces, thereby shortening the cleaning time and improving the working efficiency and cleaning effect.

Figure 7:
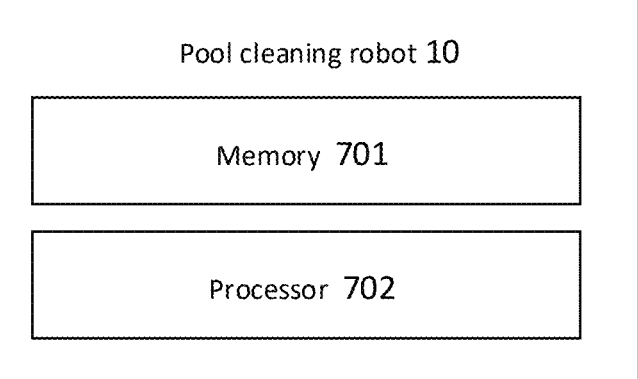
FIG. 7 is a block diagram illustrating the pool cleaning robot according to the embodiment of the present disclosure.

FIG. 7 is a block diagram illustrating the pool cleaning robot according to the embodiment of the present disclosure. As shown in FIG. 7, the pool cleaning robot 10 according to the embodiment of the present disclosure at least includes a memory 701 and a processor 702. The memory 701 is used for storing computer-readable instructions. The processor 702 is used for running the computer-readable instructions, so that the pool cleaning robot 10 executes the path control method according to the embodiment of the present disclosure as described above. It is easy to understand that the pool cleaning robot 10 according to the embodiment of the present disclosure is not limited to the above components, and FIG. 7 only shows the components related to the path control method according to the embodiment of the present disclosure.

Figure 8:
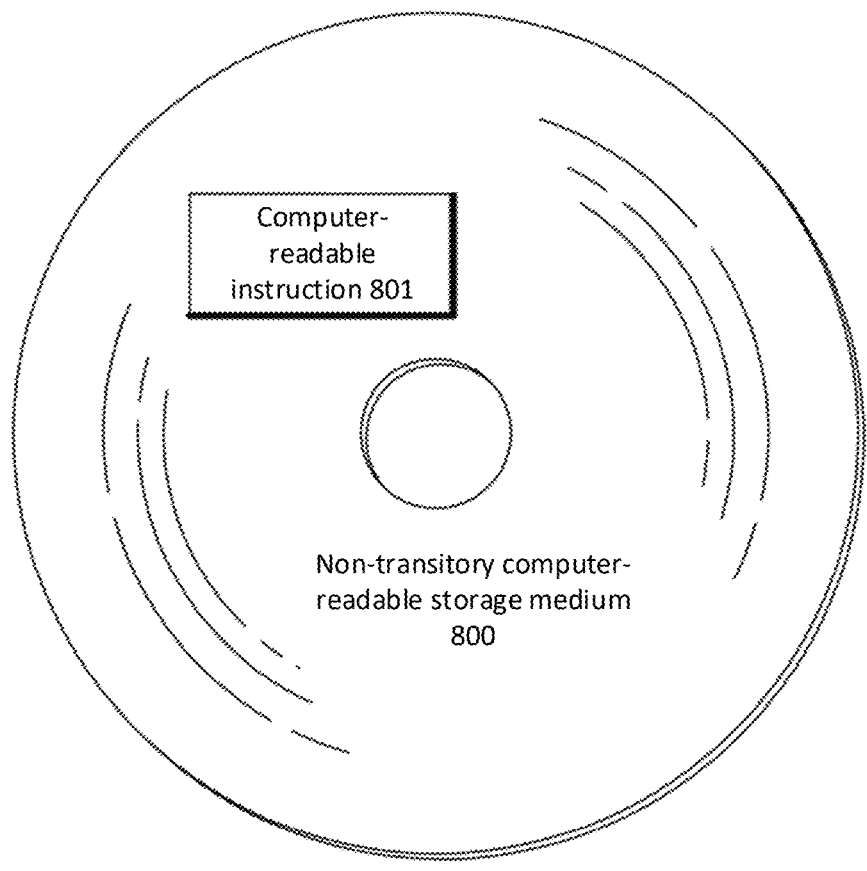
FIG. 8 is a schematic diagram illustrating the non-transitory computer-readable storage medium according to the embodiment of the present disclosure.

FIG. 8 is a schematic diagram of a non-transitory computer-readable storage medium according to an embodiment of the present disclosure. As shown in FIG. 8, a non-transitory computer-readable storage medium 800 according to an embodiment of the present disclosure has computer-readable instructions 801 stored thereon. When the computer-readable instructions 801 are executed by a processor, the path control method according to the embodiment of the present disclosure as described above is implemented.

The above describes the path control method for a pool cleaning robot, the pool cleaning robot, the non-transitory computer-readable storage medium, and the computer program product according to the embodiment of the present disclosure with reference to the accompanying drawings. By performing overall path planning across different working surfaces, cleaning of the junctions, corners, and waterline areas formed by different working surfaces is achieved, thereby shortening the cleaning time and improving the working efficiency and cleaning effect.

The basic principles of the present disclosure are described above in combination with specific embodiments. However, it should be noted that the advantages, benefits, and effects mentioned in the present disclosure are only examples and not limitations, and it cannot be considered that these advantages, benefits, and effects are necessary for each embodiment of the present disclosure. In addition, the specific details disclosed above are only for the purpose of illustration and easy understanding, and are not limitations. The above details do not limit the present disclosure to the necessity of using the specific details described above to achieve.

The block diagrams of the devices, apparatuses, equipment, and systems involved in the present disclosure are only illustrative examples and are not intended to require or imply that the connection, arrangement, and configuration must be carried out in the manner shown in the block diagrams. As those skilled in the art will recognize, these devices, apparatuses, equipment, and systems can be connected, arranged, and configured in any manner. Words such as "including", "comprising", and "having" are open-ended words, meaning "including but not limited to", and can be used interchangeably with them. The words "or" and "and" used herein mean "and/or" and can be used interchangeably with them, unless the context clearly indicates otherwise. The word "such as" used herein means "such as but not limited to"and can be used interchangeably with it.

In addition, as used herein, the "or" used in the enumeration of items starting with "at least one" indicates a separate enumeration, so that for example, the enumeration of "at least one of A, B, or C" means A or B or C, or AB or AC or BC, or ABC (that is, A and B and C). In addition, the term "exemplary" does not mean that the described example is preferred or better than other examples.

It should also be noted that in the systems and methods of the present disclosure, each component or each step can be decomposed and/or recombined. These decompositions and/or recombinations should be regarded as equivalent solutions of the present disclosure.

Various changes, substitutions, and modifications to the techniques described herein can be made without departing from the technology defined by the appended claims. In addition, the scope of the claims of the present disclosure is not limited to the specific aspects of the processing, machines, manufacturing, compositions of events, means, methods, and actions described above. Processes, machines, manufacturing, compositions of events, means, methods, or actions that currently exist or will be developed later that perform substantially the same function or achieve substantially the same result as the corresponding aspects described herein can be utilized. Therefore, the appended claims include such processes, machines, manufacturing, compositions of events, means, methods, or actions within their scope.

The above description of the disclosed aspects is provided to enable any person skilled in the art to make or use the present disclosure. Various modifications to these aspects will be very obvious to those skilled in the art, and the general principles defined herein can be applied to other aspects without departing from the scope of the present disclosure. Therefore, the present disclosure is not intended to be limited to the aspects shown herein, but is to be accorded the widest scope consistent with the principles and novel features disclosed herein.

The above description has been given for the purpose of illustration and description. In addition, this description is not intended to limit the embodiments of the present disclosure to the forms disclosed herein. Although multiple example aspects and embodiments have been discussed above, those skilled in the art will recognize certain variations, modifications, changes, additions, and sub-combinations thereof.

The invention claimed is:

1. A path control method for a pool cleaning robot, comprising:
controlling the pool cleaning robot to move along a first working path in a first direction on a first working surface of a pool to a boundary line between the first working surface and a second working surface;
controlling the pool cleaning robot to cross the boundary line and move a first predetermined distance along a second working path in a second direction on the second working surface to reach a first switching point;
controlling the pool cleaning robot to move from the first switching point to the starting point of a third working path on the second working surface and move along the third working path in the second direction,
in the case where the second working surface is a side surface of the pool, controlling the pool cleaning robot to move along the third working path in the second direction to the waterline of the pool;
controlling the pool cleaning robot to move along the third working path in a third direction opposite to the second direction to the boundary line;
controlling the pool cleaning robot to cross the boundary line and move a second predetermined distance along a fourth working path in a fourth direction opposite to the first direction on the first working surface;
controlling the pool cleaning robot to move again along the fourth working path in the first direction on the first working surface to the boundary line between the first working surface and the second working surface;
controlling the pool cleaning robot to cross the boundary line and move a first predetermined distance along a fifth working path in the second direction on the second working surface to reach a second switching point,
wherein the first working surface is the bottom surface of the pool, and wherein the pool cleaning robot cleans both working surfaces as it moves.

2. The path control method according to claim 1, further comprising:
controlling the pool cleaning robot to move from the second switching point to the starting point of a sixth working path on the second working surface and move along the sixth working path in the second direction.

10

3. The path control method according to claim 1, wherein the first predetermined distance is determined at least based on a water depth of the pool and/or a distance of the pool robot from a liquid surface of the pool.

4. The path control method according to claim 1, wherein the controlling the pool cleaning robot to move to the third working path on the second working surface comprises:
controlling the pool cleaning robot to rotate a predetermined angle at the first switching point and move to the starting point of the third working path.

5. The path control method according to claim 1, wherein the second working path is parallel to the third working path, and the distance between the second working path and the third working path is less than or equal to a predetermined width.

6. The path control method according to claim 1, further comprising:
before controlling the pool cleaning robot to move on the first working surface of the pool, determining the second working surface and taking the direction perpendicular to the second working surface as the first direction.

7. The path control method according to claim 1, wherein the second working surface is a working surface to be cleaned and/or a working surface closest to the pool cleaning robot.

8. A pool cleaning robot, comprising a memory for storing computer-readable instructions; and a processor for running the computer-readable instructions, so that the pool cleaning robot executes a path control method, comprising:
controlling the pool cleaning robot to move along a first working path in a first direction on a first working surface of a pool to a boundary line between the first working surface and a second working surface;
controlling the pool cleaning robot to cross the boundary line and move a first predetermined distance along a second working path in a second direction on the second working surface to reach a first switching point;
controlling the pool cleaning robot to move from the first switching point to the starting point of a third working path on the second working surface and move along the third working path in the second direction;
in the case where the second working surface is a side surface of the pool, controlling the pool cleaning robot to move along the third working path in the second direction to the waterline of the pool;
controlling the pool cleaning robot to move along the third working path in a third direction opposite to the second direction to the boundary line;
controlling the pool cleaning robot to cross the boundary line and move a second predetermined distance along a fourth working path in a fourth direction opposite to the first direction on the first working surface;
controlling the pool cleaning robot to move again along the fourth working path in the first direction on the first working surface to the boundary line between the first working surface and the second working surface;
controlling the pool cleaning robot to cross the boundary line and move a first predetermined distance along a fifth working path in the second direction on the second working surface to reach a second switching point,
wherein the first working surface is the bottom surface of the pool, and wherein the pool cleaning robot cleans both working surfaces as it moves.

9. The pool cleaning robot according to claim 8, wherein the path control method further comprises:

controlling the pool cleaning robot to move from the second switching point to the starting point of a sixth working path on the second working surface and move along the sixth working path in the second direction.

10. The pool cleaning robot according to claim 8, wherein the first predetermined distance is determined at least based on a water depth of the pool and/or a distance of the pool robot from a liquid surface of the pool.

11. The pool cleaning robot according to claim 8, wherein the controlling the pool cleaning robot to move to the third working path on the second working surface comprises:

controlling the pool cleaning robot to rotate a predetermined angle at the first switching point and move to the starting point of the third working path.

12. The pool cleaning robot according to claim 8, wherein the second working path is parallel to the third working path, and the distance between the second working path and the third working path is less than or equal to a predetermined width.

13. The pool cleaning robot according to claim 8, wherein the path control method further comprises:

before controlling the pool cleaning robot to move on the first working surface of the pool, determining the second working surface and taking the direction perpendicular to the second working surface as the first direction.

14. A non-transitory computer-readable storage medium for storing computer-readable instructions, wherein when the computer-readable instructions are executed by a processor, the processor executes a path control method comprising:

controlling the pool cleaning robot to move along a first working path in a first direction on a first working surface of a pool to a boundary line between the first working surface and a second working surface;

controlling the pool cleaning robot to cross the boundary line and move a first predetermined distance along a second working path in a second direction on the second working surface to reach a first switching point;

controlling the pool cleaning robot to move from the first switching point to the starting point of a third working path on the second working surface and move along the third working path in the second direction;

in the case where the second working surface is a side surface of the pool, controlling the pool cleaning robot to move along the third working path in the second direction to the waterline of the pool;

controlling the pool cleaning robot to move along the third working path in a third direction opposite to the second direction to the boundary line;

controlling the pool cleaning robot to cross the boundary line and move a second predetermined distance along a fourth working path in a fourth direction opposite to the first direction on the first working surface;

controlling the pool cleaning robot to move again along the fourth working path in the first direction on the first working surface to the boundary line between the first working surface and the second working surface;

controlling the pool cleaning robot to cross the boundary line and move a first predetermined distance along a fifth working path in the second direction on the second working surface to reach a second switching point, wherein the first working surface is the bottom surface of the pool, and wherein the pool cleaning robot cleans both working surfaces as it moves.

* * * * *